United States Patent
Castaldi et al.

(10) Patent No.: US 7,182,462 B2
(45) Date of Patent: *Feb. 27, 2007

(54) SYSTEM AND METHOD FOR UPDATING AN IMAGE DISPLAY DEVICE FROM A REMOTE LOCATION

(75) Inventors: Joseph Castaldi, West Linn, OR (US); Robin F. Hoeye, Tigard, OR (US); Karla Fisher, Gaston, OR (US); Greg Kim, Portland, OR (US); Steve Hampson, Lake Oswego, OR (US); Susan Michalak, Portland, OR (US); Mark Porter, Portland, OR (US); Kevin Thompson, Salem, OR (US); Jennifer Jaffe, Portland, OR (US); Sonia Carver, Lake Oswego, OR (US); Leon Dagler, Sherwood, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/858,693

(22) Filed: Jun. 1, 2004

(65) Prior Publication Data
US 2006/0007400 A1    Jan. 12, 2006

Related U.S. Application Data

(63) Continuation-in-part of application No. 10/033,474, filed on Dec. 26, 2001, now Pat. No. 6,830,340.

(60) Provisional application No. 60/474,501, filed on May 29, 2003.

(51) Int. Cl.
G03B 21/26    (2006.01)
G03B 21/00    (2006.01)
H04N 9/31    (2006.01)

(52) U.S. Cl. .................. 353/30; 353/121; 353/122; 348/744

(58) Field of Classification Search .............. 353/121, 353/30, 31, 122; 348/744
See application file for complete search history.

(56) References Cited

U.S. PATENT DOCUMENTS

2002/0196378 A1 * 12/2002 Slobodin et al. ............ 348/744
2004/0041989 A1 *  3/2004 Olson et al. ................ 353/122

* cited by examiner

Primary Examiner—Melissa Jan Koval
(74) Attorney, Agent, or Firm—Alleman Hall McCoy Russell & Tuttle, LLP.

(57) ABSTRACT

In a computing device, a method of updating over a network a set of executable instructions stored on an image-rendering device is disclosed, wherein the image-rendering device is operably associated with a projection device. The method includes detecting a version of the set of executable instructions on the image-rendering device, and sending an updated set of the executable instructions to the image-rendering device over the network.

29 Claims, 14 Drawing Sheets

---

Presenter Update Wizard

Update Finished
The list below indicates which Presenter modules were successfully updated.

| Presenter Module | Update Status | Firmware Version |
|---|---|---|
| Dragonfly | Updated | 1.5 (current) |
| LightStream | Updated | 1.5 (current) |
| Starship Enterprise | Updated | 1.5 (current) |
| Yadda Yadda | Updated | 1.5 (current) |

All selected Presenter modules were successfully updated.

< Back    Finish    Cancel

Installing over Newer Version Alert

| Presenter Module | Update Status | Percent Complete |
|---|---|---|
| Dragonfly | Resetting | 100% |
| LightStream | In Progress | 70% |
| Starship Enterprise | Queued | 0% |
| Yadda Yadda | Queued | 0% |

FIG. 15

| Presenter Module | Update Status | Percent Complete |
|---|---|---|
| Dragonfly | Updated | 100% |
| LightStream | Resetting | 100% |
| Starship Enterprise | In Progress | 70% |
| Yadda Yadda | Queued | 0% |

FIG. 16

SYSTEM AND METHOD FOR UPDATING AN IMAGE DISPLAY DEVICE FROM A REMOTE LOCATION

CROSS-REFERENCE TO RELATED APPLICATIONS

The present application claims priority under 35 U.S.C. § 119 to U.S. Provisional Patent Application Ser. No. 60/474,501, which was filed on May 29, 2003, which is hereby incorporated by reference in its entirety for all purposes. The present application is also a continuation-in-part of, and claims the benefit of, U.S. patent application Ser. No. 10/033,474, which was filed on Dec. 26, 2001, now U.S. Pat. No. 6,830,340 which is also hereby incorporated by reference in its entirety for all purposes.

TECHNICAL FIELD

The present disclosure relates generally to a system and method for updating software or firmware on an image display device from a remote location over a network.

BRIEF DESCRIPTION OF THE DRAWINGS

FIGS. 5–8 and 11–18 are example windows that may be provided on a user's device interfacing with a projector.

DETAILED DESCRIPTION

Figure 1:
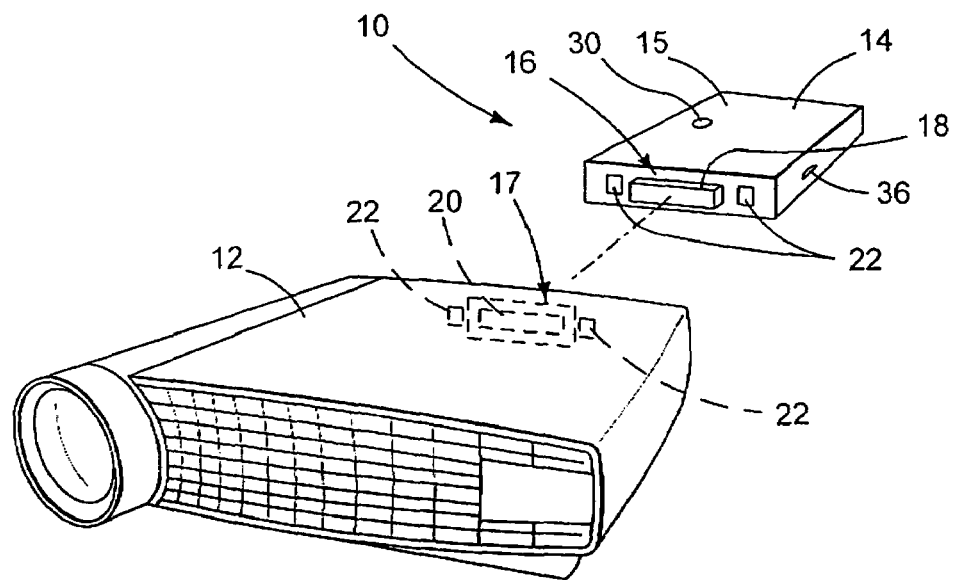
FIG. 1 is an exploded isometric view of an image projector and an image-rendering device according to one embodiment.

In recent years, projector devices, such as digital projectors, have found increased popularity as a tool for the presentation of content to an audience. These projectors are typically used to project a computer-generated presentation onto a viewing surface, and allow a user to easily present high-quality, professional appearing images to audiences of a range of sizes. As a result, these projectors are now often found as permanent fixtures in conference rooms and other meeting facilities.

Some projector devices are configured to enable a user to access a presentation by coupling their computer to the projector. Typically, a user must physically connect their computer, such as a personal computer or personal digital assistant (PDA), to the image projector. This process may present issues to the presenter. For example, there may be compatibility issues between the hardware and software on the computer and on the image projector. Moreover, connection to the image projector may require numerous cables and/or adapters to enable connection of the user's computer with the available projector. It is not unusual for the cables and adapters to get lost or become misplaced.

Thus, where cables are used to connect image sources directly to a projector, there may be issues when multiple presenters use the same projector. For example, when transitioning from a first presenter to a second presenter, the first presenter must physically connect an image source, such as a computer, to an image projector using the appropriate adapters and cables. The first presenter then typically seats himself or herself close to the image projector. When the second presenter wants to present their presentation, the first presenter may have to disconnect the computer from the image projector, enabling the second presenter to connect a new computer to the image projector, possibly using different adapters and cables. Typically, the first presenter may have to change seats with the second presenter to provide room for the second-presenter to connect to the image projector. This transition between the first and second presenter may take a significant period of time and be disruptive to a meeting.

To address at lease some of these issues (or others), an image-rendering device can be used that is configured to connect to (either wirelessly or via a wire) and receive image data from many different types of image sources, to render images from the data, to communicate With the image sources and peripheral devices, and to perform these functions with reduced input and effort from a user.

This disclosure includes various example user interface systems for use with an image transmitting/receiving/rendering device and an associated projector device. The user interface may be configured to allow a user to control the image transmitting/receiving/rendering device, and to utilize the image transmitting/receiving/rendering device to control the presentation of content by, and administrative aspects of, the associated projector device. The disclosed user interface systems may be implemented in many different use environments. Also, the disclosed user interface systems can be simple enough for inexperienced users to use yet includes capabilities permitting experienced users to access advanced features.

The disclosed projector device user interfaces may include several individual components. These may include, but are not limited to, an installer, a presentation manager (configured to manage the presentation of an image by the associated projector device), a projector manager (configured to manage the administrative aspects of the associated projector device), an uninstaller, and online help documentation. Various features of these components are described in more detail below. While the disclosure provides an overview of the user interface by describing particular implementations in Windows and/or Apple OS X environments, any environment may be used, such as PALM or other PDA operating environments, and as such the present disclosure provides some operational details common to any operating system environment. Further, the term "Presenter" is used to describe the overall image presentation system, including but not limited to the image source (e.g., a computing device), the presenting device (e.g. a digital projector), and any image compression/decompression/transmission hardware, firmware, and/or software associated with these devices.

The disclosed user interface system may be used with any suitable image transmitting/receiving/rendering device and associated projector device. An example a suitable device is described below with regard to FIGS. 1, 2, and 4.

Referring now specifically to FIG. 1, an image display system is shown generally at 10. Image display system 10 typically includes an image projector or visual presentation projector 12 and ah image-rendering or image-transformation device 14. Briefly, image-rendering device 14 is operably coupled to, or otherwise operably associated with, image projector 12, such that images are transferred from image-rendering device 14 to image projector 12 for presentation on a projection or viewing surface. Image-rendering device 14 is adapted to receive images from a plurality of different sources and is further adapted to automatically transmit a projectable image-to-image projector 12. Image-rendering device 14 may also be referred to herein as "image-rendering module" or "presenter module."

Image projector 12 may be any suitable display device, including, but not limited to, liquid crystal display (LCD) projectors, digital light processing (DPL) projectors, front and rear projection display systems, etc. Therefore, where the discussion herein is directed toward projectors, it will be appreciated that the discussion may apply to any other suitable image display device.

The depicted image-rendering device 14 includes a body 15. Body 15 is configured to be selectively inserted at least partially within an attachment slot 17 in image projector 12. Specifically, body 15 includes a projector connecter 16. Projector connector 16 functions to couple image-rendering device 14 to image projector 12. Projector connector 16 further functions to transmit or transfer a projectable image-to-image projector 12. As illustrated in FIG. 1, projector connector 16 may include a plug 18 that is adapted to be received into a corresponding outlet 20 in image projector 12, permitting image-rendering device 14 to directly engage or plug into image projector 12. Attachment structures, including latches 22, projections, pins, tabs, braces, screws or other suitable supports, may be used to retain image-rendering device 14 within outlet 20. Alternatively, instead of an integral connector, projector connector 16 may be attached to projector 12 in a remote fashion via a cable and suitable plug.

Body 15 of image-rendering device 14 may include at least one image receiver configured to receive a plurality of different data transfer devices. Data transfer devices may enable image-rendering device 14 to receive images from multiple sources. A data transfer device may be a card, an expansion board, an adapter or other suitable device. For example, a data transfer device may be a network interface card, such as a wired network card, or a wireless network card (e.g. a wireless LAN card, such as IEEE 802.11a, 802.11b, 802.11g, 802.11x, a radio card, a Bluetooth radio card, a ZigBee radio, etc.). In one example, a network interface card may enable communication between device 14 and an independent source, e.g. a remote computer, server, network, etc. This communication may allow an image or presentation stored on the independent source to be transmitted to image-rendering device 14 after the independent source identifies and selects projector 12, as described in more detail below.

Image-rendering device 14 further may include at least one peripheral device connector 36 on body 15. Peripheral device connector 36 is configured to enable at least one peripheral device to be operably linked to image-rendering device 14 to enable images to be transferred from a peripheral device to image projector 12 or vice versa. Peripheral connector 36 may be any suitable connector. For example, peripheral connector 36 may be a standard connector, such as a Universal Serial Bus (USB) port, IEEE 1394 port, parallel port, e.g. enhanced parallel port (EPP), extended capabilities port (ECP), etc. It should be noted that more than one peripheral connector may be provided on body 15. Further image-rendering device 14 may also include a light, such as a light emitting diode (LED) 30, which can be used for diagnostic functions, described in more detail below. Alternatively, the LED 30 may be located as the projector, such as in the example when image-rendering device 14 is internally located in projector 12.

In an alternative embodiment, selected functions and selected components of image-rendering device 14 may be integrally formed within projector 12.

Figure 2:
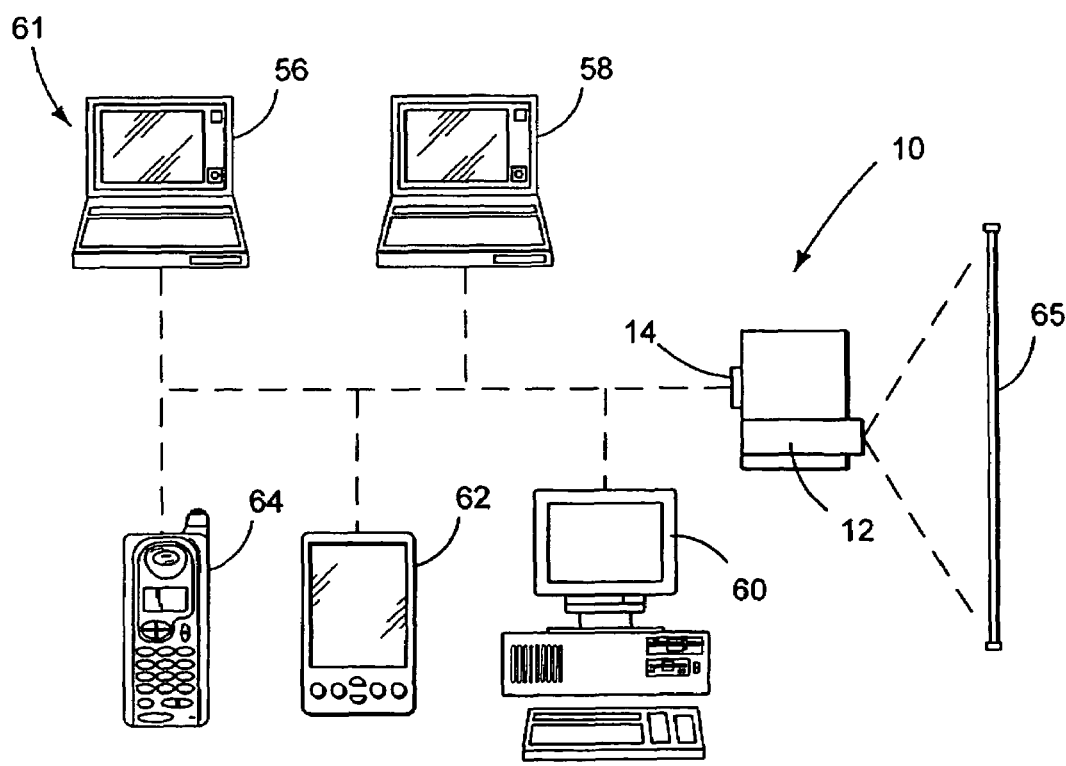
FIG. 2 is a graphical representation of an exemplary use environment showing an implementation of the embodiment of FIG. 1.

FIG. 2 illustrates an exemplary Use environment in which image-rendering device 14 may be implemented. Specifically, image-rendering device 14 is shown in a network environment 61. Network environment 61 may include a plurality of different devices, such as computers, laptops, servers, handheld computers, etc. The insertion of an appropriate network card into image-rendering device 14 may enable presentation content on each of the network devices to be selectively transmitted to image-rendering device 14 for display by image projector 12. As shown, image projector 12 may display the transferred image onto a display surface 65.

In one embodiment, a splashette function may be included in the device 14 and/or projector 12. The splashette may include a small window that appears in the upper right corner of the screen (although other locations can also be selected) at selected conditions, such as start-up/power-up. The rest of the screen may consist of a black background, for example. The splashette may contain various items and/or information, which are described in more detail below herein with regard to FIG. 9.

As described above, the network interface card may be either a wireless network card or a wired network card. Alternatively, projector 12 may include wireless or wired network capability integrally formed in the projector unit. It should further be appreciated that a wireless network card may be permanently integrated within image-rendering device 14. The wireless network card may enable a plurality of users to alternatively link to the local area network and send images/presentations to an image projector without individually having to manually couple their computer to a projector. Additionally, as long as a user's computer device is capable of linking to the local area network using standard protocols and transferring data, the type and model of the computer linked to device 14 may be irrelevant. No adapters or cables are necessary for the wireless connection (although they could be used, if desired). Thus, users may be able to present from any location in a room, or remote from the room.

Such a system may be particularly useful in meeting room environments, where multiple individuals using the same projector system for presentations may be using different operating systems and/or platforms. For example, in FIG. 2, five computers (two portable computers or laptops 56 and 58, a desktop computer 60, a handheld computer 62, and a telephone 64) are shown linked to device 14 over a wireless LAN. Any of the users may link to image projector 12 via image-rendering device 14 wirelessly. Usually, the user who is presenting or the active presenter releases or exits from the currently active presentation to enable a second presenter to begin sending data to device 14 for presentation.

It should be understood that any suitable computer or computing device that may be capable of wirelessly linking to the local area network and conveying an image, or the URI or other indicator of the location of an image, to device 14 may be used. Computers, as used herein, include, but are not limited to, desktop computers, handheld computers, laptop Computers, servers, mainframes, telephones, etc. It will also be appreciated that the various user interface components and functions described herein are typically embodied in instructions or code stored in memory on, and executable by a processor on, such a computer or computing device.

Figure 3:
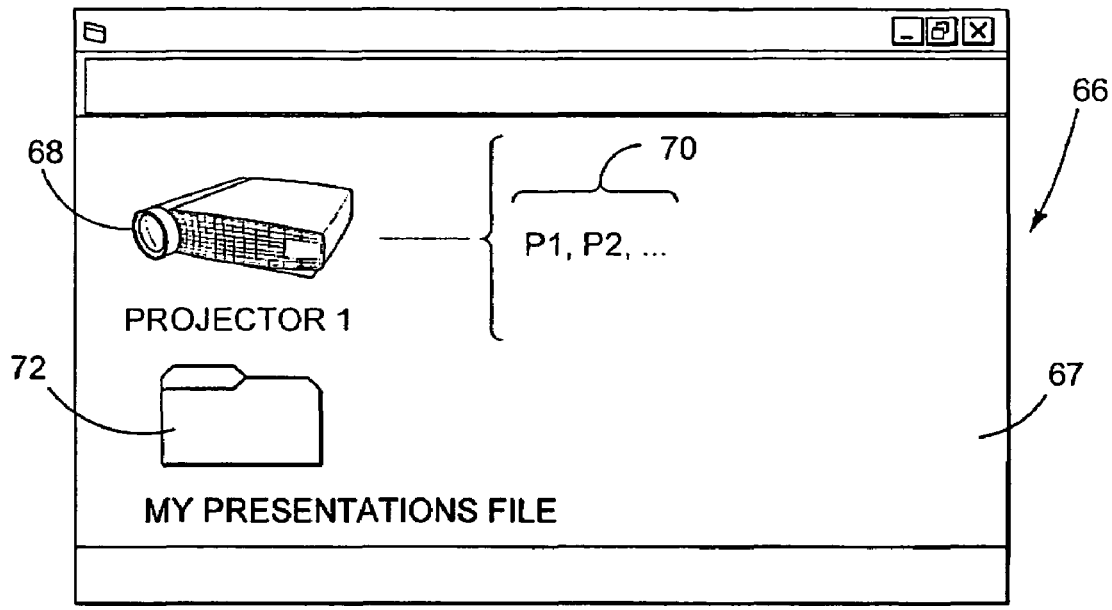
FIG. 3 is a representative user interface for the system depicted in FIG. 1, showing an embodiment of a projector selection window.

Device 14 enables the transfer of data to image projector 12 by connecting a user's computer with an image projector. In some embodiments, device 14 may communicate the name of the projector to which it is coupled to the user's computer, while also projecting the name onto screen 65 when the projector is initially powered on. Thus, when a user connects to a network on which the projector is located, the projector may appear as an icon, or be added to a list of projectors to which the computer may be connected. In this situation, the user may select the projector from the list of projectors to connect to a specific image projector. An exemplary user interface is shown in FIG. 3, as well as FIGS. 5–8, and 10–18. The exemplary user interface of FIG. 3 includes a selection window 66 for display on a computer screen 67, but other formats are possible. The user interface may include a projector icon 68. Such an icon may be used to identify the projector that is currently available on the network. For example, and as shown in FIG. 3, "Projector 1" is linked to the user's computer via device 14. Alternatively, a user may be able to select the desired projector from a list of projectors 70.

The user interface also may include a presentations file 72 configured to allow a user to store presentations or images for display. When a user desires to present a presentation, a local wireless network card may be inserted into an image receiver within image-rendering device 14. The name or identifier for the linked projector may then be broadcast to the user's computer indicating that the user can connect to the image projector and send images and/or presentations to device 14. The user may then select a presentation from presentations file 72 and direct it to the linked projector via projector icon 68. The user does not need to physically move his/her computer next to image projector 12, nor does the user have to plug adapters or cables into his/her computer to connect to the image projector (although the user can, if desired). Instead, the user simply connects to the wireless network and directs a desired image or presentation to the projector. The user may remain seated the entire time and does not need to move to a position near the projector when presenting (although the user may, if desired).

As discussed above, data and/or images may be transmitted from a user's computer to device 14 in many different formats. For example, an image file corresponding to the appearance of the display on the user's computer (screen shots or scrapes) may be sent to device 14. Image data may also be transferred in other formats using a reduced amount of transmission bandwidth, if desired.

It should be noted that in some embodiments, the user's computer may send the image data directly to image-rendering device 14. Alternatively, the user computer may send data including a universal resource indicator (URI) to image-rendering device 14, which directs device 14 to the appropriate location to pick up the desired image/presentation.

As discussed above, a wired network card also may be received within the image receiver. It will be appreciated that a wired network card also may be permanently integrated within image-rendering device 14 without departing from the scope of the present disclosure.

Figure 4:
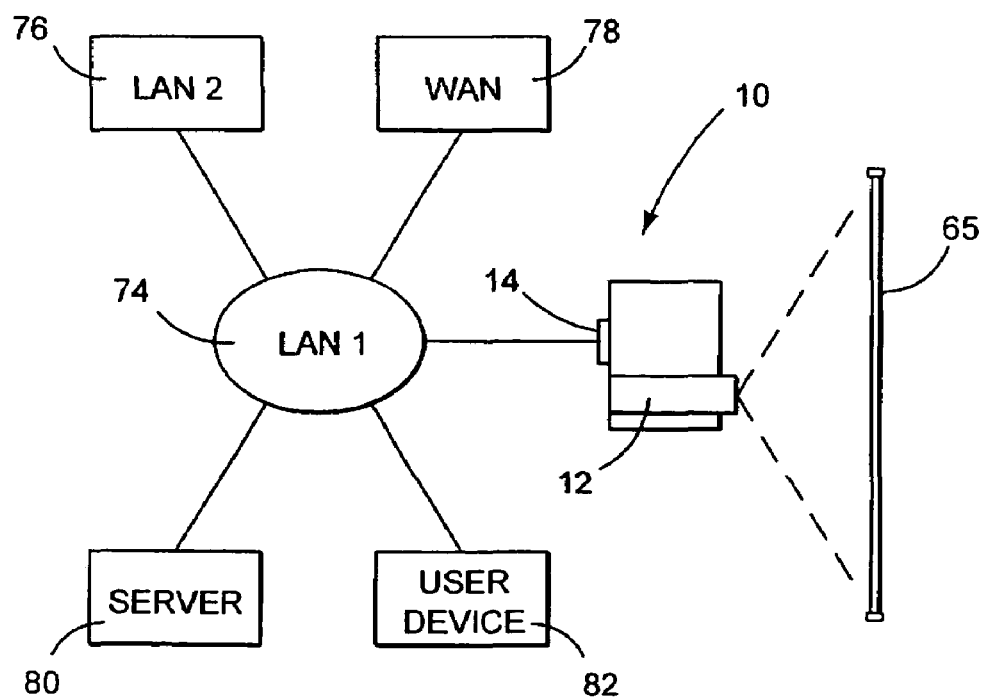
FIG. 4 is a schematic diagram of another exemplary use environment in which an example embodiment may be implemented.

An exemplary network environment is shown in FIG. 4. As illustrated, image-rendering device 14 may be connected directly to a LAN 74 via a wired and/or wireless network card. Image-rendering device 14 may be further linked to a second LAN 76 and/or a WAN 78, such as the Internet, through LAN 74. Image-rendering device 14 also may be able to connect to a remote server 80 or user 82 via LAN 74. Such a configuration may enable a user to run a presentation on image projector 12 from a remote location.

It should be noted that image-rendering device 14 may be compact and portable. Typically, image-rendering device 14 may be much smaller and lighter than a conventional laptop. Moreover, no user input device, such as a keyboard or mouse, is necessary (although one can be included if desired). The device can be an automatic rendering engine configured to automatically render and transmit images from a first source to an image projector for display.

As noted above, a user interface may be used with the system to enable a user to perform various functions, such as transferring and projecting images. While one example user interface was described above, various others may be used. One such alternative embodiment user interface may have the following components: an installer, a presenter manager, a projector manager, an uninstaller, and online help documentation.

The installer may be used to walk the user through installing software necessary to use a presenter module, which controls operation such as giving presentations from a user's computer over a wireless network to a projector. The installer also allows users to identify the directory into which they would like to install the software, choose whether they want a desktop shortcut, and automatically launch the user manual and the presenter manager application when the installation is finished. It may also offer to test any Wireless PC card provided.

The presenter manager component allows the user to select a projector in range, start and stop projecting, and set preferences. It also allows the user to adjust the presenter module's settings—for example, to rename the presenter module and the presenter module's network, to specify the presenter module's IP address if desired, and/or to reset the presenter module's settings to factory defaults. This component may be decoupled from the presenter software—for example, it may be on a presenter install CD.

The uninstaller allows the user to easily uninstall the presenter software.

The online help documentation may provide users with easy access to online help.

Figure 5:
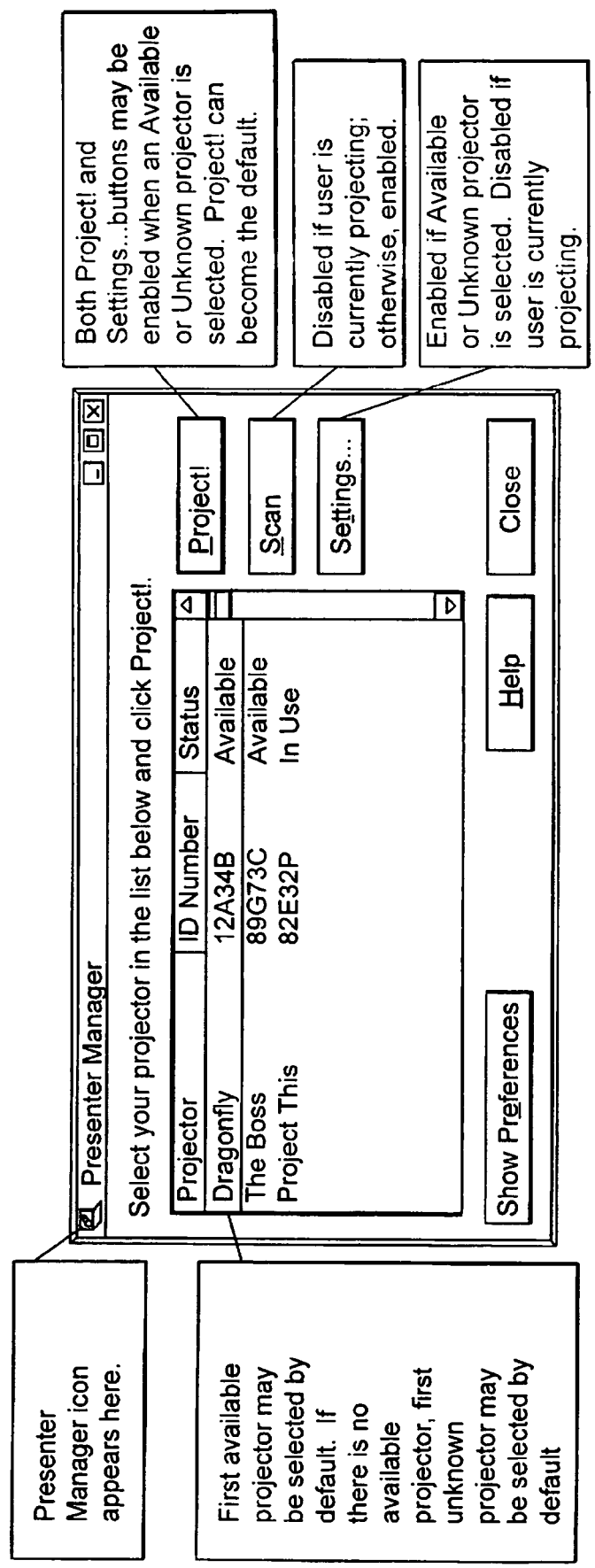

Referring now to the presenter manager in more detail, when the user launches the presenter manager operating on their computer, for example, a window may open to its normal view shown in FIG. 5. Upon launch, the presenter manager may take a snapshot of the user's current wireless local area network (WLAN) settings and populate a list of projectors with projectors and/or image-rendering devices found in the current WLAN as well as the last five image-rendering devices used (MRU, or "most recently used"). The projectors on the current WLAN may be discovered in any suitable manner. Suitable manners of discovering projectors on the WLAN include, but are not limited to, monitoring a multicast address on the WLAN to which the projectors and/or image-rendering devices are configured to send announcement messages, or "beacons," announcing their presence and/or availability; and/or receiving broadcast or unicast beacons. Note that while in this example the last five devices used may be included, this is just an example and more or less (or none) of the last or previously used devices may be listed. Further details of the operation of the presenter manager are provided below With regard to FIG. 10.

As shown in FIG. 5, the list of projectors may have three columns: Projector, ID Number, and Status. By default, the primary sort is by status and the secondary sort is by projector name, although other sorting approaches may be used, if desired. The first available projector in the list is highlighted by default; and if there are no available projectors in the list, then the first unknown projector is highlighted by default. The user can move the highlight bar by pressing the up/down arrow keys, or with the mouse, for example. While the depicted embodiment includes a list of projectors, it will be appreciated that it may include other types of image display devices in the list. Examples include, but are not limited to, rear projection display devices.

The Status column indicates whether each projector is available, in use, or unknown, although other identifiers could be used, or only a single identifier may be used. If a projector is in Use, its name may be grayed out (unless it is the projector the user is currently using). If there is only one available projector in the list, it may be selected by default. A projector's status may be unknown if it is one of the last 5 projectors used but is not on the current WLAN, for example.

A projector may be dropped from the list when a beacon is no longer heard and the WLAN settings are the same as when last checked and an attempt to connect to that projector has failed. Otherwise, the projector is left in the list and is unknown. However, a user may also drop a projector from the list manually.

Note that there may be issues with listening for beacons and adding/dropping devices to the list based on the beacon. For example, a value that is too short may result in projectors flashing in and out of the list. Alternatively, a value that is too long may result in inaccurate status. Therefore, in one example, the time to listen for a beacon on PC-based devices may be set to approximately 5 beacon intervals (i.e. the time between receiving beacons), while on Mac-based devices the value may be set to approximately 9 beacon intervals, to obtain desired performance. However, in an alternative embodiment, a common listening time may be used for all devices. These values may also be added to the registry on the PC and to a preferences file on the Mac so that users with different antennas and in different environments can adjust the values to suit their needs.

In one example, the MRU list of the last or previously used devices may be updated based on whether a device is successfully used. If so, it may be added to the list. Further, if the WLAN is the same and no beacons are detected, the device may stay in the list with an indicated status of unknown. If the user tries to connect to it and it is not available, an error may be displayed and then the projector may be dropped from the MRU list.

If an available or unknown projector is selected, the Project! in the figure button may be the default button. The Project! button may be disabled if there are no projectors or devices found, or if there is no projector or device selected. Note that, in this example, the user may only select an available or unknown projector; projectors that are in use appear in the list but may be grayed out.

When the user selects an available projector and clicks the Project! button (or hits the Enter key), a screen scrape application starts. When the screen scrape application has started (that is, the user's desktop has been rendered in the projected image), the button toggles to Stop and the status of the selected projector or device flips to indicate that it is in use. However, unlike projectors that are in use by others, which are grayed out, the projector that the user is using does not become grayed out.

If there is a lag between clicking the Project! button and the appearance of the projected image, the user may see some visual feedback that the software is responding to the button press. If the lag is only two seconds, holding down the Project! button for a second would give the user feedback that something is happening and may prevent them from clicking the button again. If the lag is longer than two seconds, some other feedback may be provided—for example, text in the lower right corner of the screen may be used which states, "Establishing wireless link. Please wait."

If the user selects a projector with a status of "unknown" and clicks the Project! button, an alert dialog may be provided to notify the user that current network activities may be disrupted while the program looks for available devices or projectors, and that the user should close any applications using files on the network. Proceeding past this point dismisses the dialog and replaces it with a progress dialog that may be used to indicate progress in the search.

Figure 6:
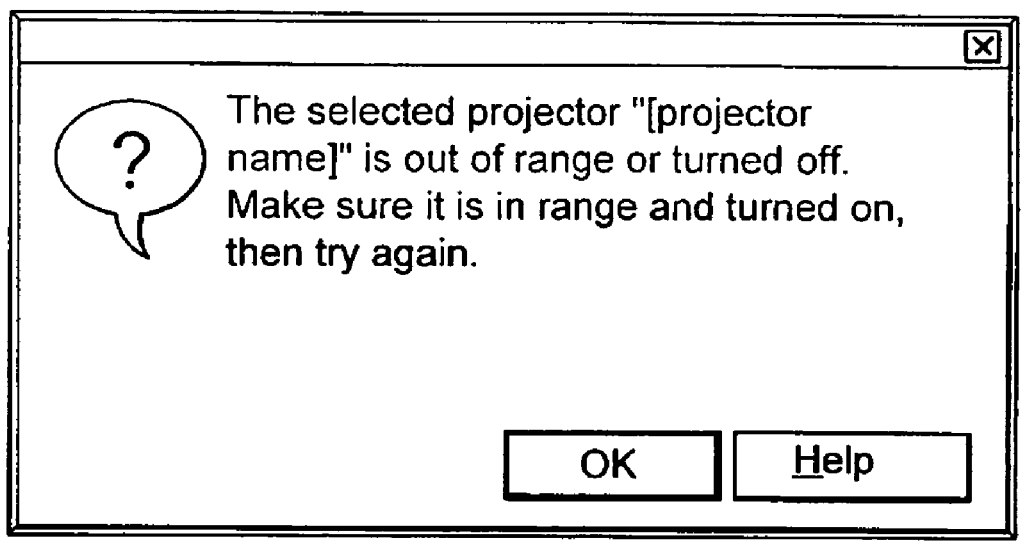
Figure 7:
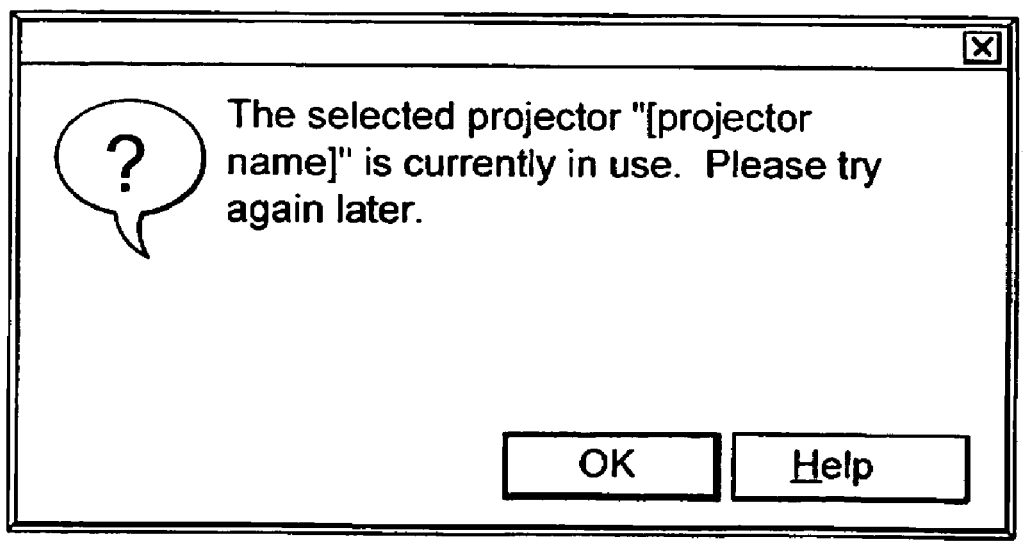

One of three things may then happen (when the user selects a projector or device whose status is unknown): (1) The projector or device cannot be found (e.g., it is out of range or turned off), which may generate an alert dialog as shown in FIG. 6, (2) the projector is found but is in use, which generates an alert dialog as shown in FIG. 7, or (3) the projector is found and is available, Which projects the contents of the user's desktop (or some other selected file) on screen.

The Scan button may be enabled unless the user is currently projecting. Clicking the Scan button may also cause an alert dialog, followed by a progress dialog as described above. If more presenter-enabled projectors or devices are found, they may also appear on the list. If no more presenter-enabled projectors or devices are found, the progress dialog may be replaced by a dialog which states that no more presenter-enabled projectors or devices were found.

A Settings . . . button may be enabled when an available projector or device, or the projector Or device the user is currently using, is selected. Clicking it opens a settings dialog, which may allow the user to adjust various settings, such as, for example: the presenter name, network name, and IF address (the user can either choose to obtain an IP address automatically or specify the IP address, net mask, and gateway). The presenter module's MAC address may also be provided as read-only information. The Settings . . . button is still available when projecting, but all content of the settings dialog may be read-only to reduce disruption of a presentation. A diagnostics tab may also be provided which may enable a user to blink LED 30 on a projector or image-rendering device to verify a proper connection, and/or restore factory settings. The diagnostics tab may also illustrate the LED location on the projector or device, such as on the image-rendering device (30).

Also, from the settings dialog, a password can be set and used. Users do not have to set a password and, by default, there is no password. However, any user could select and change an image-rendering device module's settings. If the user is concerned about others changing the presenter module's settings, s/he can protect the settings with a password. To set a password, the user clicks a button in the settings dialog and a password dialog appears which allows the user to set and confirm a password. If a password is set, the next time the user opens the settings dialog, all of its settings and controls are read-only and the password is required to make changes. If the user just changes the image-rendering device module's name, the user will still be communicating with the image-rendering device module. If the user was projecting at the time the name was changed, projection continues and the name updates in the list. If the user was not projecting, the splashette may update itself with the new name and the name may also update in the projector manager list.

Figure 8:
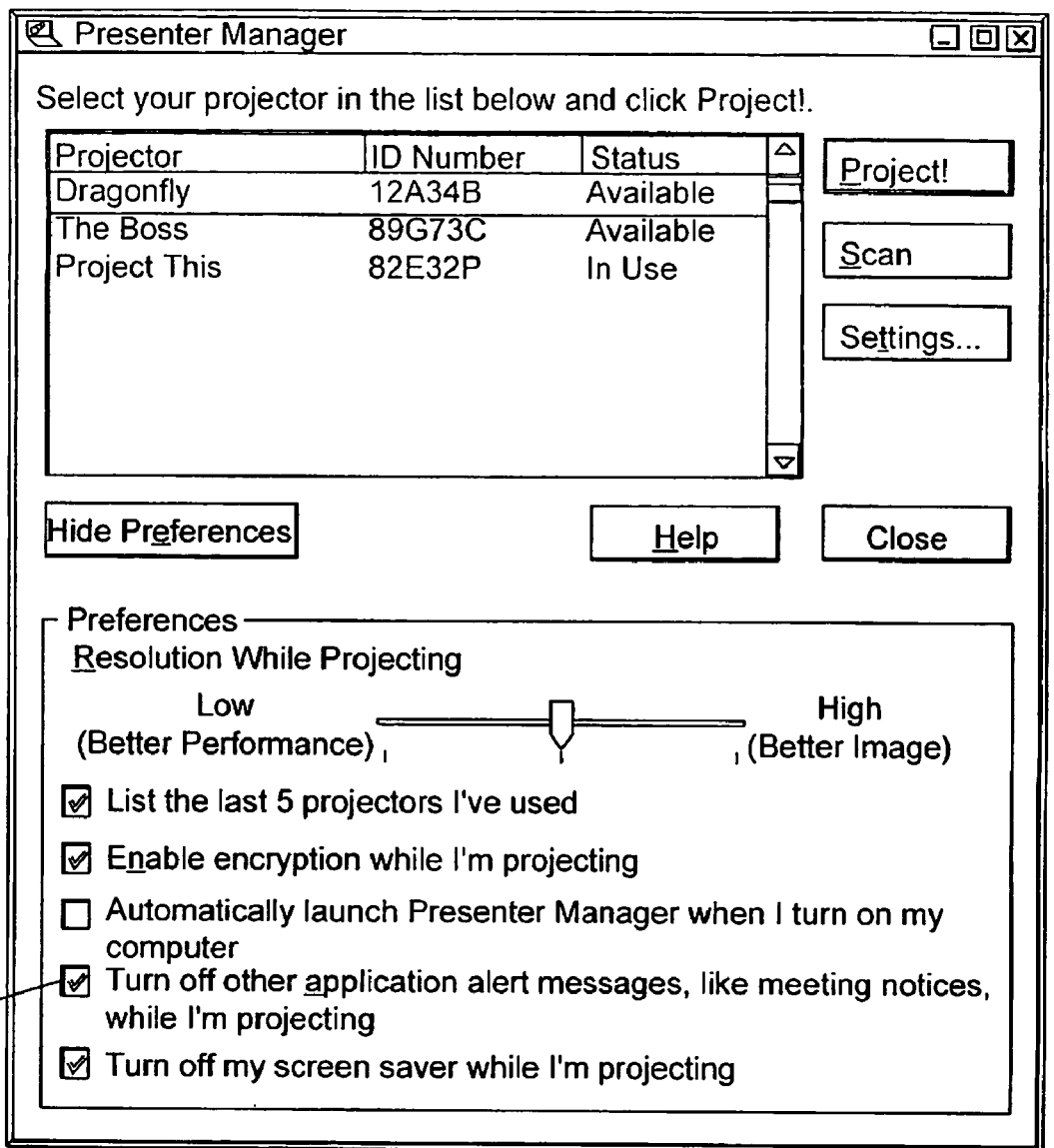

If the user clicks the Show Preferences button in the normal view, the window may expand and the button toggles to Hide Preferences. The expanded view may give the user access to application-specific preferences, for example. The Show/Hide Preferences button may always be enabled; however, preferences that cannot be changed during projection may still be disabled while the user is projecting. FIG. 8 shows an example expanded window of the presenter manager.

The resolution slider may provide three or more ticks (or less, if desired). The text in the table below may appear in tool tips that appear above each tick mark:

| System | Left | Middle | Right |
| --- | --- | --- | --- |
| PC | 800 × 600 × 16 bit color | 1024 × 768 × 16 bit color | 1024 × 768 × 24 bit color |
| Mac | 800 × 600 × thousands of colors | 1024 × 768 × thousands of colors | 1024 × 768 × millions of colors |

The slider thumb can default to any tick, such as the middle tick. The user can then move the input focus to the resolution slider by pressing Ctrl-R and use the right and left arrow keys on the keyboard to move the slider's thumb back and forth, or using a mouse. The selection on the resolution slider is invoked when the user projects and, when the user stops projecting, the user's previous display resolution setting (if different) may be restored. Whenever the desktop display is about to change from the user's current display setting, an alert dialog may appear when the user clicks the Project! button. For example, the alert dialog may appear if the user's system is in an unsupported resolution (e.g., 1400×5200) or if the user has changed the selection on the slider and it is now different from the user's current display setting.

Continuing with FIG. 8, the default state of the checkbox for "List the last 5 projectors I've used" is checked. If the user unchecks this box, the last 5 projectors used—that are not on the current WLAN and are not currently in use—can be removed from the list. Various other default checked boxes are also illustrated, which may be unchecked by the user.

While FIGS. 5–8 and the corresponding description has described portions of an example user interface, various other approaches may be used. For example, an interface adapted to be used with a Mac system may also be provided. Example changes that may be used are that: the system may automatically provide for a menu bar for any application which may include a "Show Info" feature; the system may take advantage of other features, such as sheet dialogs, the system may used different placement of typical controls; or the system may not use right-click mouse button features.

Figure 9:
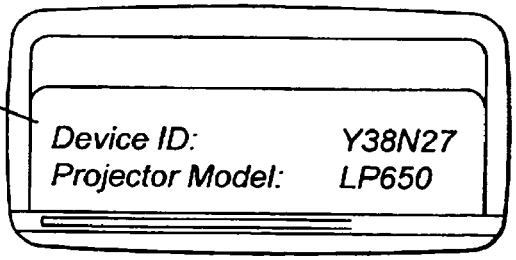
FIG. 9 is an example splashette image generated by a projector at selected conditions.

Referring now to FIG. 9, an example splash screen, or splashette, is described. The splashette may be a small or large window that appears in the upper right corner (or other area) of the screen. The splashette may contain one or more of the following fields, or combinations there of:

Name: presenter projector name;
Unique ID: presenter unique ID (which may be derived from a MAC address);
WLAN: presenter network name;
Model: projector model;
Version: 1.0.x.x (which may be in light gray);
IP address (which may be in light gray);

Note that a USB test may be performed at boot-up that checks for existence of USB communications. If none are found, a star can be used to so indicate.

The presenter splashette may appear upon various operating conditions, such as when the projector is powered on, when the M1 connector is the source, when a presenter module is connected, and/or combinations thereof. The splashette may be thirty-two characters in length to allow for the descriptor and twenty characters for each field, although smaller or larger values may be used. Also, if desired, the latest logo and color scheme may be incorporated into the title bar area. Field characters may be bolded or italicized, if desired.

Various other messages can be displayed via the splashette with the same boarder and font as above. However, the grayscale and title bar may be removed, if desired. For example, the following messages may generated by the server and displayed: Authentication (e.g. when graphics are not generated by the server, such as if the security box is checked and the user attempts to project); Radio not found; WEP incompatibility (e.g., when there device is not WEP enabled and is trying to join a WEP enabled SSID); and/or Upgrade thermometer (not generated by server).

Figure 10A:
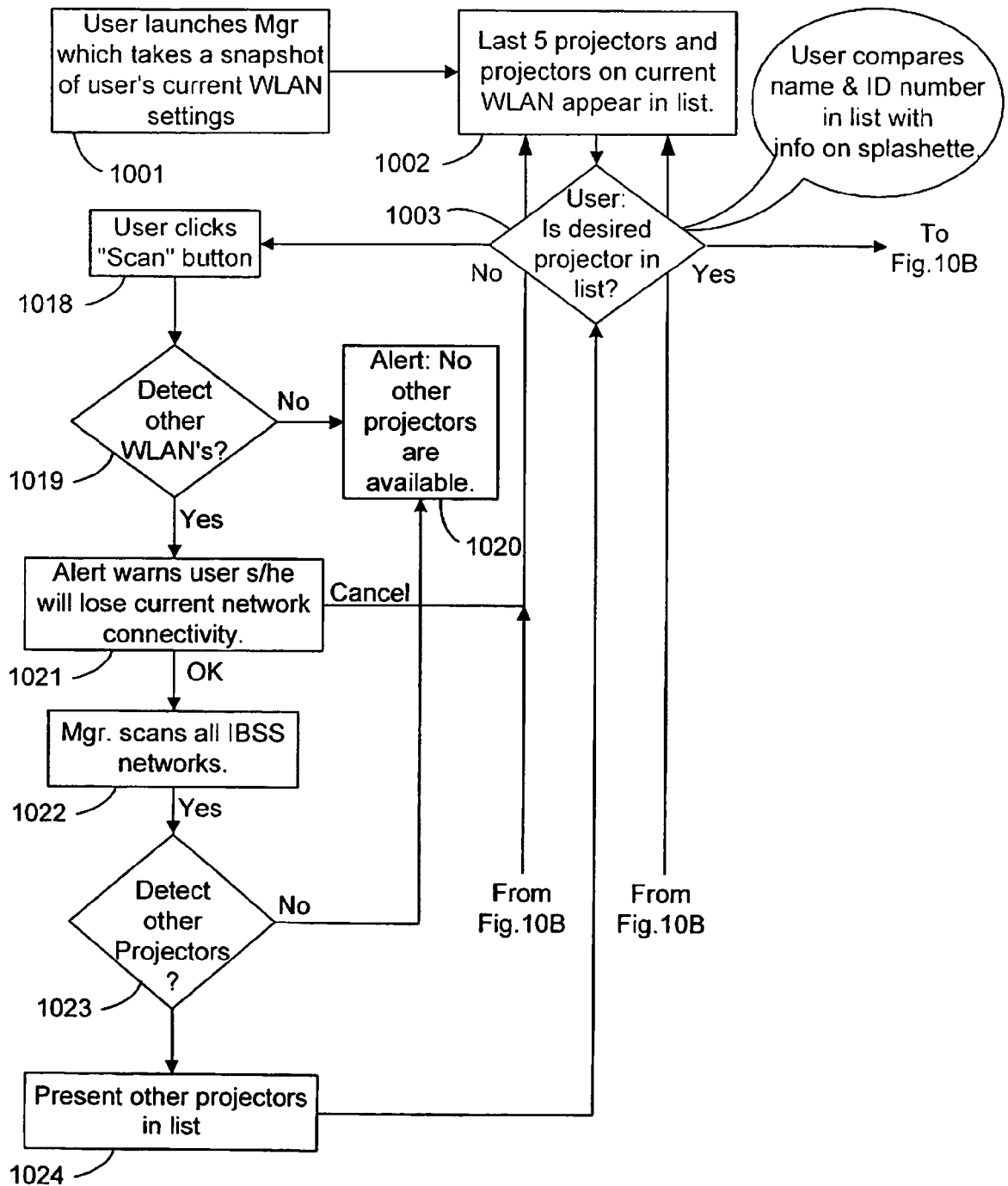
FIG. 10 is an example flow chart illustrating operation of an example user interface system.
Figure 10B:
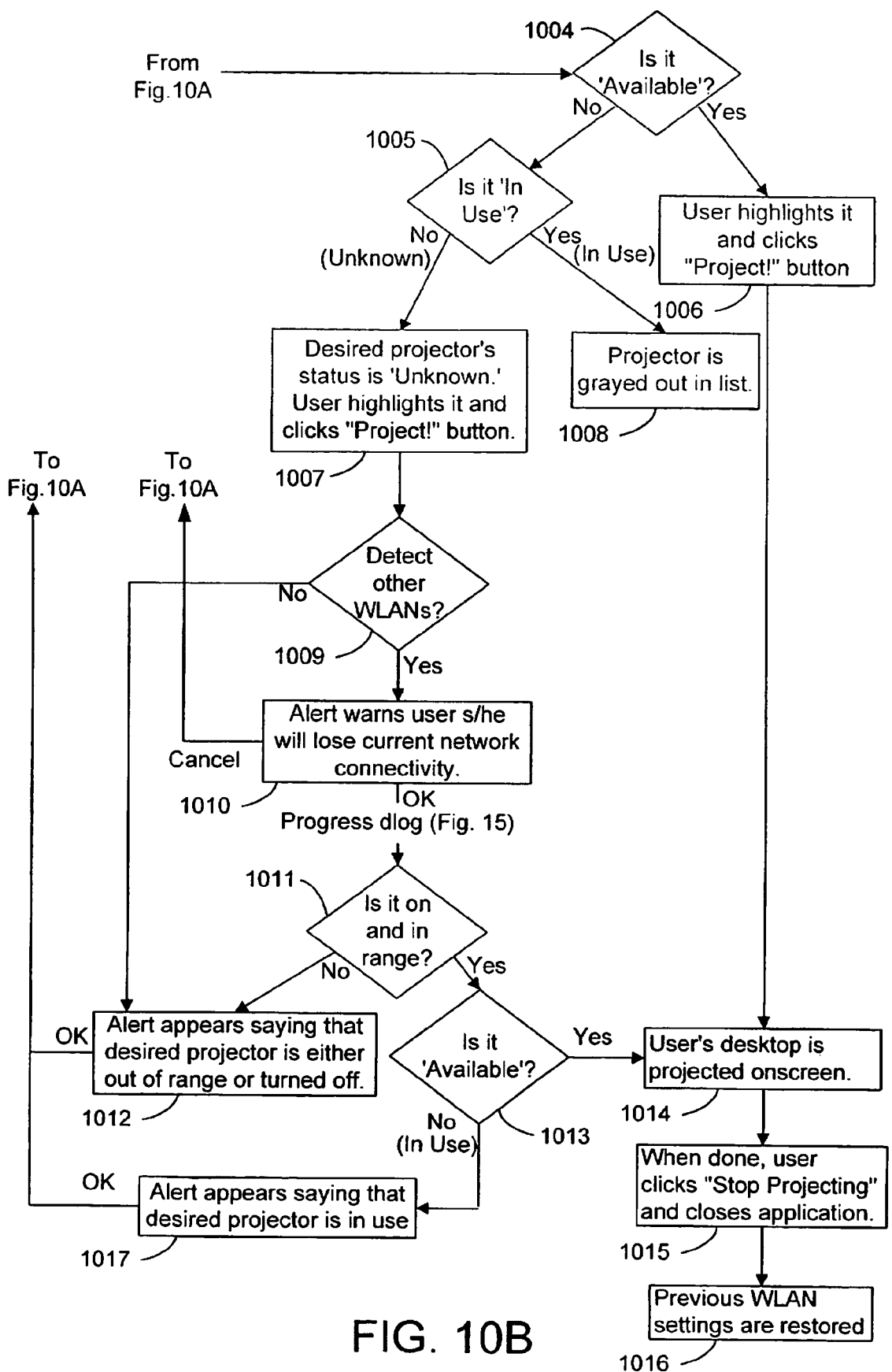

Referring now to FIG. 10, a flowchart of an example user interface routine for selecting and projecting is described. While described in the context of projectors, it will be appreciated that the following description may apply to any other suitable image display device, including but not limited to those set forth above.

First, block 1001 represents the user launching a manager sub routine (such as the projector manager described above herein), which takes a snapshot of the users current wireless local area network (WLAN) settings. Then, in block 1002, the last five projectors or devices that were used by the user, and projectors currently on the WLAN, appear in a list of identified projectors or devices that may be utilized. One example list is shown and described above herein with regard to FIG. 8. Next, in block 1003, the user determines whether the desired projector is in the list. This determination may be based on a comparison of name and ID numbers in the list with information that is being projected by the desired device, such as via a splashette.

If the desired projector (or other device) is in the list, then in block 1004, the user can determine whether the desired projector or device is available based on information displayed in the list. If the desire projector or device is not available, the user can continue to block 1005. Alternatively, if it is available, the user can continue to block 1006 to highlight the desired and available device and then click the Project! button. Then, the user's desktop can be projected via a device as described below herein with regard to block 1014.

In block 1005, the user can determine whether the desired projector is in use (for example, another user is currently transmitting and projecting). If not, the device may be an unknown device and then the user continues to block 1007. Alternatively, if the device is in use, the user can continue to block 1008. In block 1008, the projector is grayed out in the list, and the user may not select the device.

Alternatively, in block 1007, the desired projector has an unknown status and the user may highlight the projector in an attempt to project images to it. Then, in block 1009, the interface indicates whether any other wireless local area networks can be detected on Which the unknown projector may be networked. If so, in block 1010, an alert warns the user that there may be temporary network disconnectivity. Then, in block 1011, the user interface determines whether the unknown projector is in range. If not, in block 1012, the user interface provides an alert to user stating that the desired projector is either out of range or turned off. Alternatively, in block 1013, the user interface determines whether the desired projector is available. If so, the user can continue to block 1014 to project the desktop images to the device which then may be projected onto a screen, for example. Then, when the user has completed the desired projection, in block 1015, the user can click stop projecting and close the application. Finally, then in block 1016, previous WLAN settings are restored.

From block 1013, when the desired projector is not available (e.g. in use), in block 1017 the user interface provides an alert to the user stating that the desired projector is in use. From either blocks 1012 or 1017, when the user clicks OK and the user interface returns to block 1012.

From block 1013, when the desired projector is not in the list, the user can continue to block 1018 to select the scan button. Then, in block 1019, the user interface determines whether any other wireless local area networks have been detected. If not, in block 1020, the user interface provides an alert to the user indicating that no other projectors are available. Alternatively, when other networks have been identified, in block 1021, the user interface provides an alert to the user that there may be a temporary loss of network connectivity. At this point the user may cancel the operation to return to block 1002. Alternatively, if the user selects OK in block 1022, the user interface scans for all modules having a selected 802.11 internal basic service set (IBSS). In an alternative embodiment, basic service set (BSS) mode may be used. Next, in block 1023, the user interface determines whether any other images have been detected. If not, the alert from block 1020 is provided. Alternatively, if so, the user may present other image-rendering devices in the list instead, in block 1024.

The above user interface may provide a way for multiple users to effectively utilize multiple projection systems in with a simple and easy to use interface.

However, because underlying software and/or firmware may be occasionally upgraded, and different devices may be updated at different rates, if at all, an update manager may be provided to enable backward compatibility and various other features.

For example, when a new version of the image-rendering device firmware (or software) becomes available, users will be able to update their module's firmware (or software) via an update routine. Users will likely download a self-extracting ZIP file from a web site, although other approaches may also be used. One example embodiment of an update routine is described below.

Figure 11:
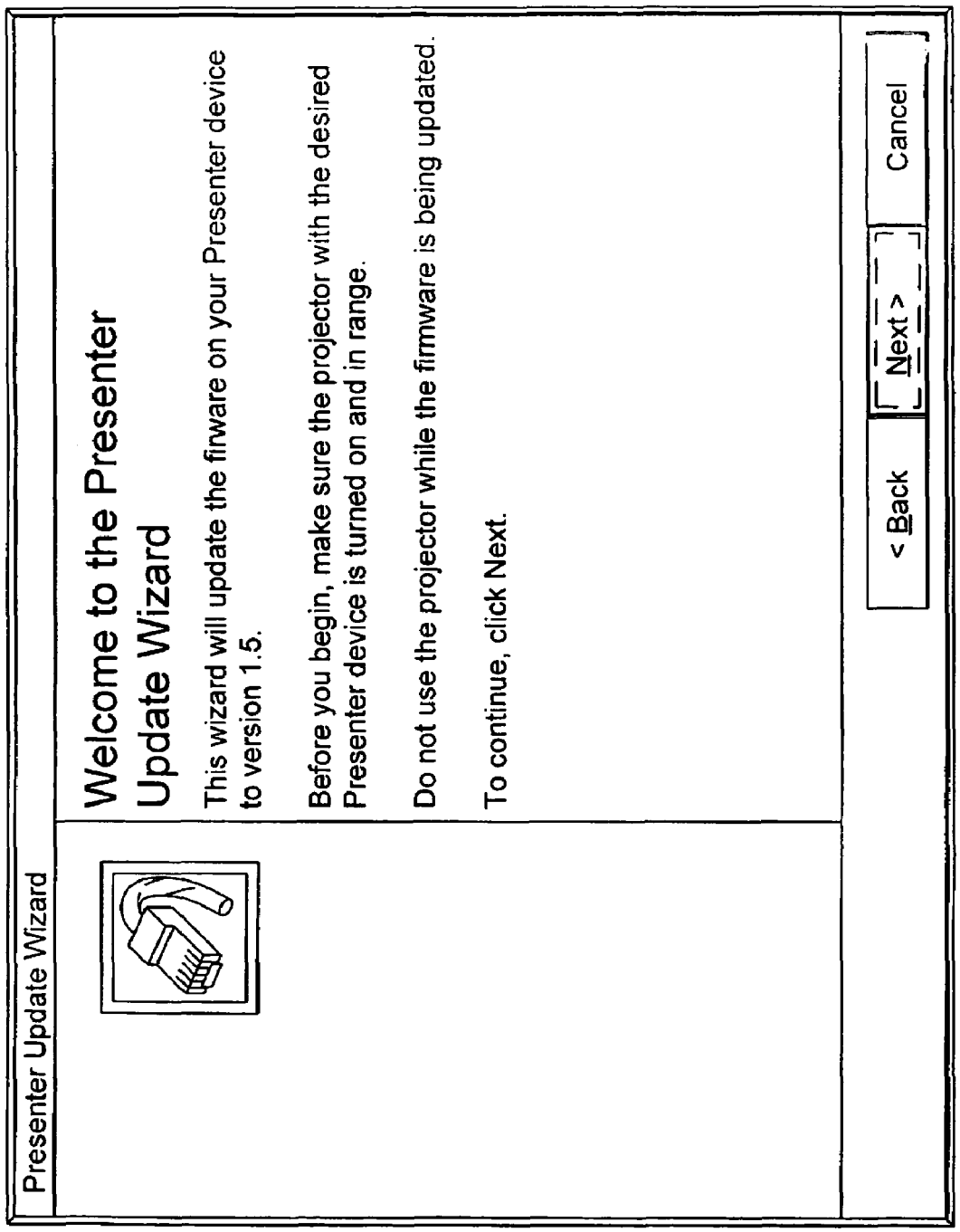

Specifically, when the user double-clicks the ZIP file, for example, the update routine self-extracts and the screen in FIG. 11 appears. When the user clicks the Next button, the screen in FIG. 12 appears, which shows a list of projectors and/or other devices populated with those found (all boxes may be unchecked by default). For example, the list may be populated with presenter-enabled projectors on the current WLAN, and/or the last n number of projectors accessed. The projectors on the current WLAN may be discovered via the methods described above in the context of FIG. 10, including but not limited to, receipt of a unicast, multicast or broadcast announcement "beacon" from the projector or associated image-rendering device. The "version" information shown in FIG. 10 may be obtained from the "beacon" message (which may contain the version information), or may be obtained by querying the detected projectors and/or associated image-rendering devices. If no projectors are in the list or if the desired projector is not in the list, the user may clicks the Scan button, which operation is described above. The Scan button may result in an alert dialog if any other WLANs are detected, notifying the user that current network activities may be disrupted during the search. If the user clicks OK, a progress dialog may appear. As more presenter-enabled projectors are found, they may appear in the list as they are found (even while the scan continues). When the scan is complete, the progress dialog closes. If no more projectors are found upon completion of the scan, a dialog appears that indicates no more presenter-enabled projectors were found. The user may then check the desired projector(s) and click Update.

Figure 12:
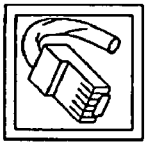
Figure 13:
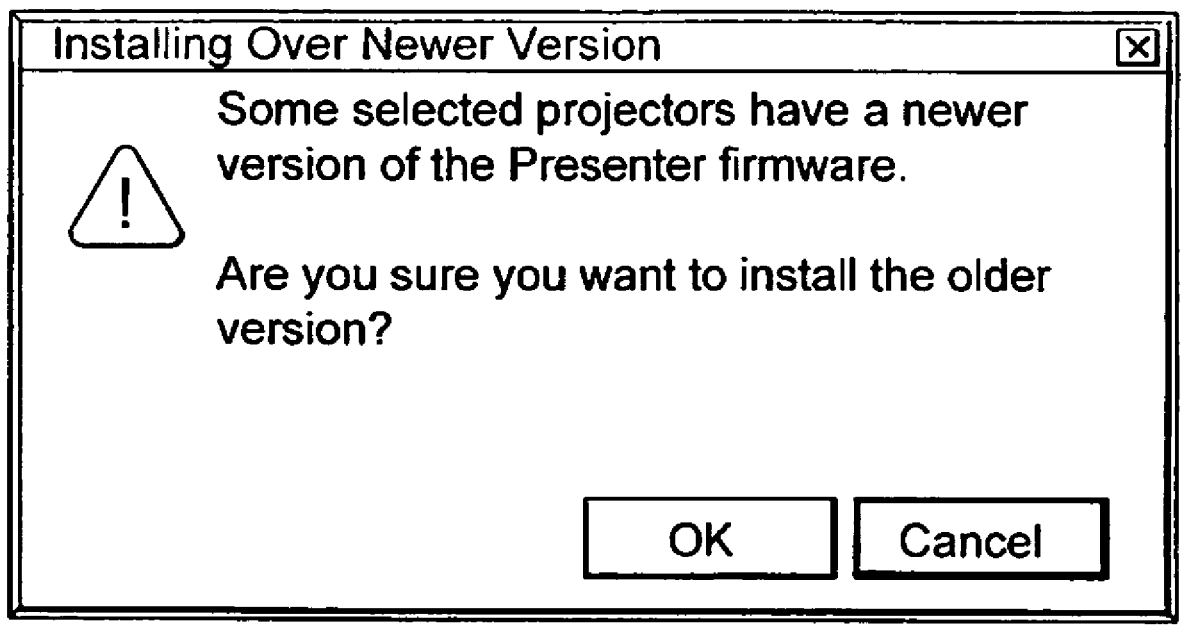
Figure 14:
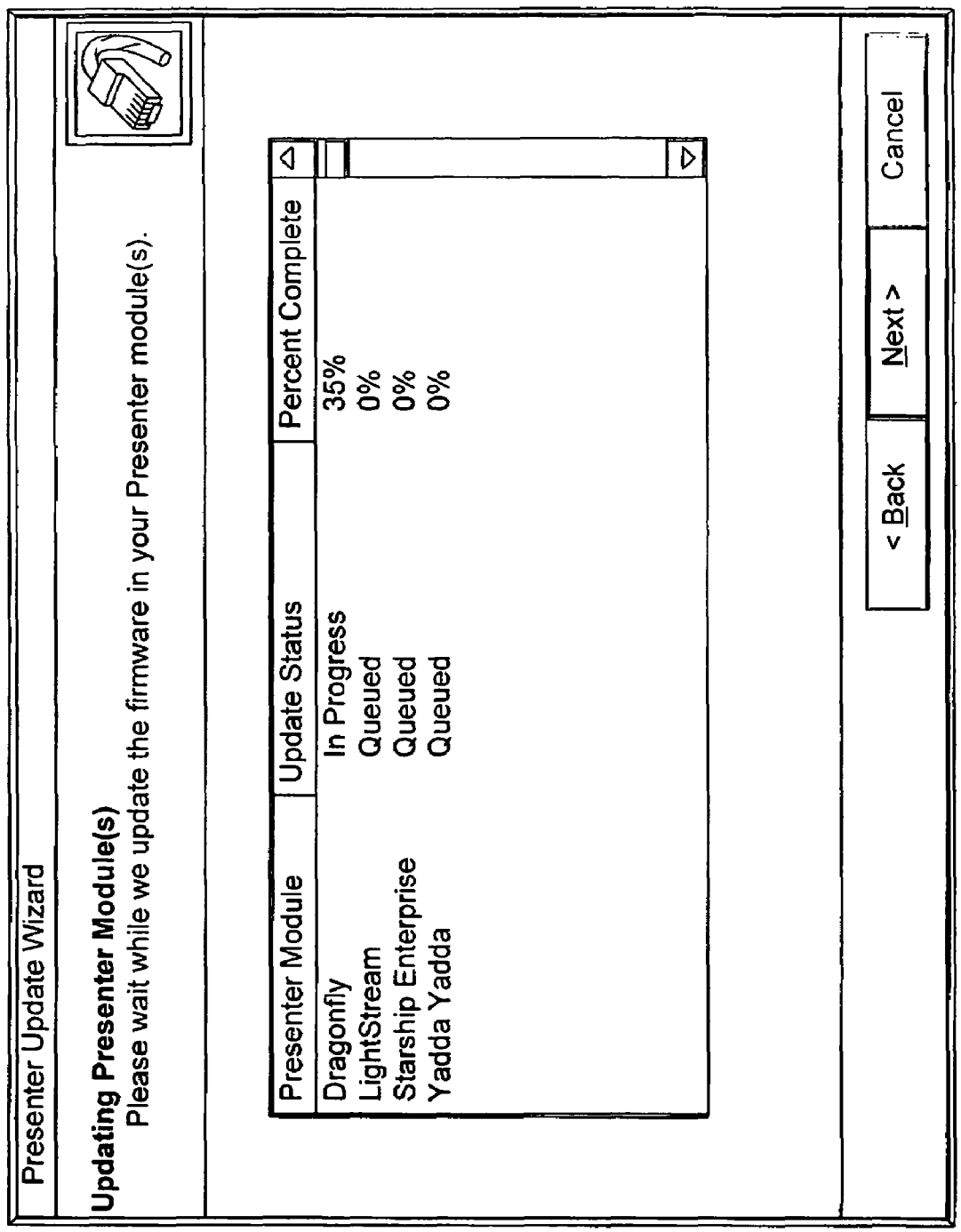

For example, if the user checked "The Boss" in FIG. 12, which has a newer version Of the firmware, the alert in FIG. 13 appears, indicating that software may be installed over a new version. When the user then clicks Update in FIG. 12 (or clicks OK in FIG. 13), the Screen in FIG. 14 appears. The status for each presenter module then updates dynamically as the update routine progresses (FIG. 14).

The update routine works through the list of projectors and provides status on each one as it goes, as shown in FIG. 15, which shows the update status changing in list. If the update for a particular presenter module goes smoothly, its status may cycle through the following text, for example: Queued (0% complete), In Progress (1–100% complete), Resetting (100% complete), and Updated (100% complete). FIG. 16 shows yet another example update of the status changing in the list.

If a selected presenter module becomes unavailable before the update routine gets to it, or while it is being updated (for example, it gets turned off or becomes out of range), its status may change to unavailable and it may remain in the same place in the list. The update routine may then try it and, if it is still unavailable, the update routine will move on to the next presenter module. When the update routine has unsuccessfully tried to update a module three times, for example, its status will change to failed.

While a presenter module is being updated, the following message may be projected oh screen: "Presenter firmware update in progress. Please wait a moment."

Figure 17:
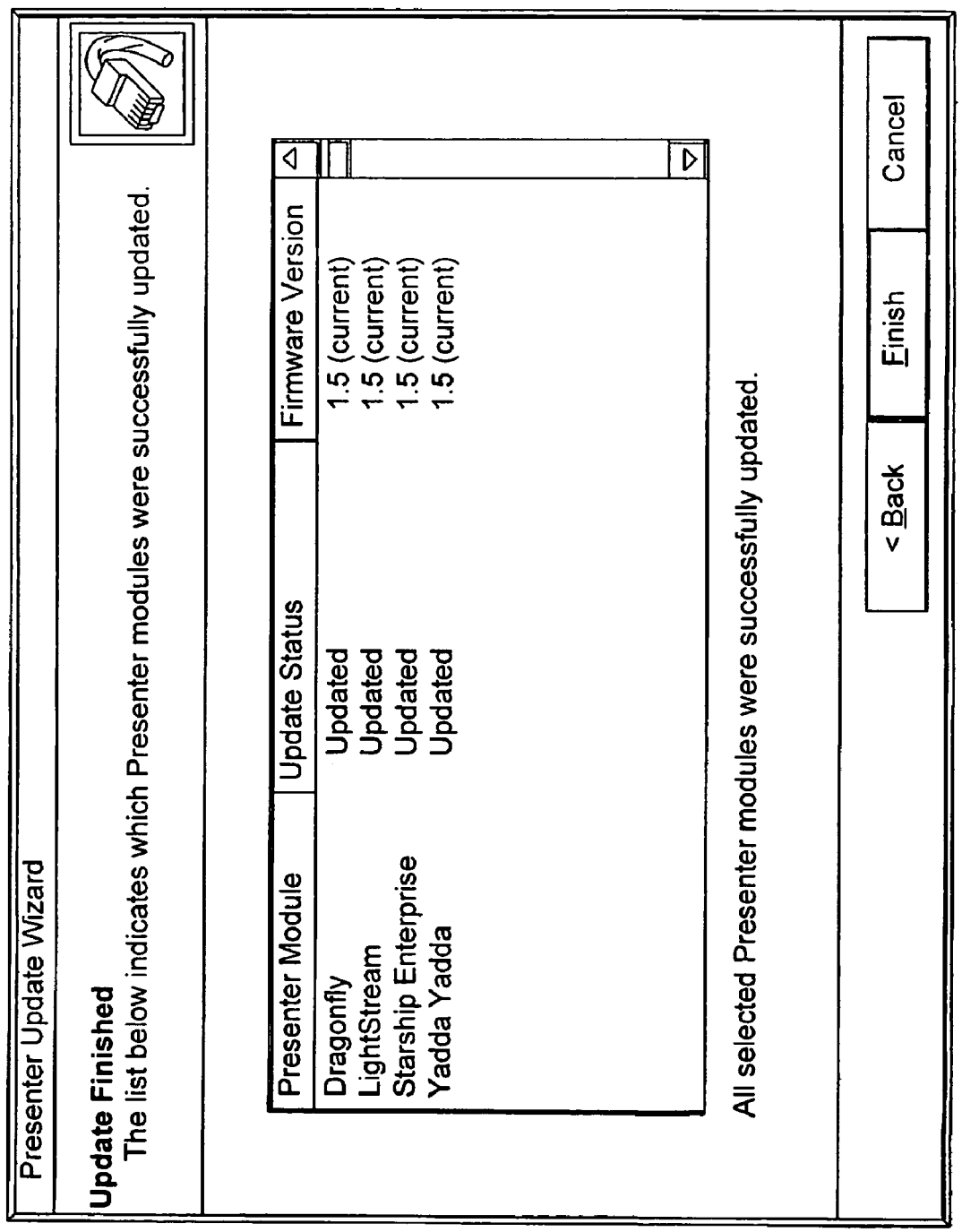
Figure 18:
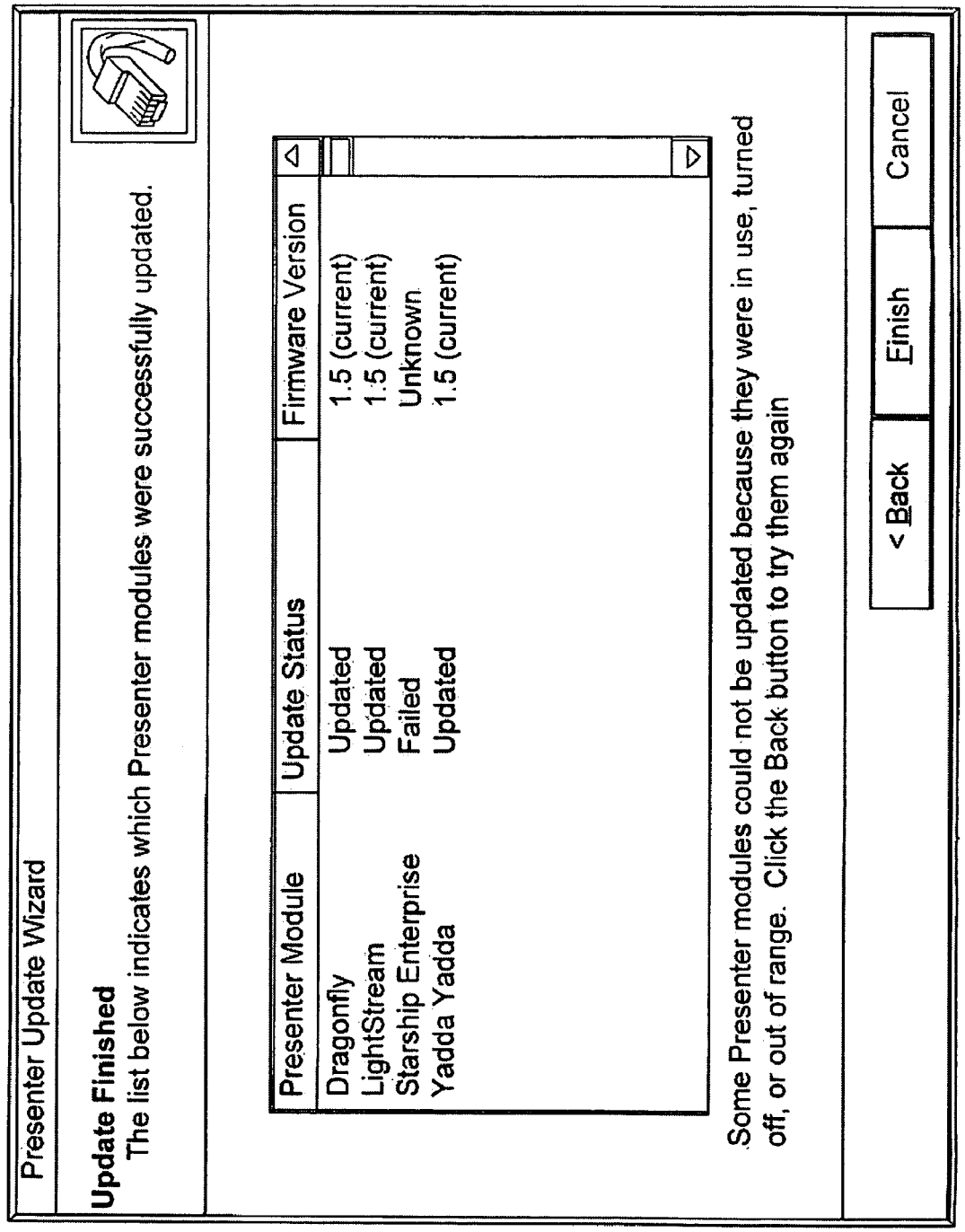

When the update routine has gone through the list of selected presenter modules, the final screen shows the results of the update. FIG. 17 shows 100% success. FIG. 18 shows what the screen would look like if one of the updates failed. If the user clicks the Back button in FIG. 17 or 18, the screen shown in FIG. 12 may appear after being refreshed to reflect the current firmware versions and status).

Another optional feature of the projection system is wired-like Security. If the "Enable Security" checkbox (located in the preferences section of the user interface described above) is not checked, all behavior is as described in previous sections of this disclosure. When a user clicks on the "Enable Security" checkbox in the preferences dialog, there are differences in how the application, the user, and the image-rendering device interact. This difference may allow for the negotiation of secure keys (challenge/response) as well as encryption of the data presented.

For example, when a user clicks on the Project button and security is enabled, a challenge is presented to the user via several user interface components. One is a splash type of screen (image-rendering message) through the image-rendering server and projector. On this screen, the user sees the challenge code in a 16-point or greater font, for example. At this same time on the laptop side (in the case of a laptop), a dialog may appear asking the user to type in the "Challenge Code" or the characters they see on the screen. When the user types in the correct code, the secure session is allowed. At this point, the data in the connection is encrypted. Any type of encryption can be used depending on the desired system specifications and the level of security desired. An incorrect challenge forces the user to click Project again and the sequence restarts. An error message may be sent to the user by the PC, telling them the challenge code failed and prompts them to try again by pushing Project.

Another additional dialog may be added for when security is enabled. Namely, during key negotiating (after a user clicks on Project), a quick dialogue may popup saying, "Establishing secure channel."

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. In a computing device, a method of updating over a network a set of executable instructions stored on an image-rendering device, wherein the image-rendering device is operably associated with a projection device, the method comprising:
    detecting a version of the set of executable instructions on the image-rendering device, the executable instructions being operable to control operation of the image-rendering device as the image-rendering device receives image data and renders such image data for display by the projection device;
    sending an updated set of the executable instructions to the image-rendering device over the network; and
    storing the updated set of executable instructions.

2. The method of claim 1, wherein sending the updated set of the executable instructions to the image-rendering device includes sending the updated set of executable instructions only if the version of the set of executable instructions on the image-rendering device is not the same version as the updated set of the executable instructions.

3. The method of claim 1, wherein a plurality of image-rendering devices are on the network, each image-rendering device including a set of executable Instructions stored thereon, further comprising detecting the version of the set of executable instructions on each image-rendering device of the plurality of image-rendering devices.

4. The method of claim 3, further comprising presenting a user interface showing each image-rendering device and the version of executable instructions detected on each image-rendering device.

5. The method of claim 4, further comprising accepting from a user a selection of at least one image-rendering device to which to send the updated set of executable instructions before sending the updated instructions.

6. The method of claim 4, further comprising sending the updated set of executable instructions to more than one image-rendering devices of the plurality of image-rendering devices.

7. The method of claim 1, wherein detecting a version of the set of executable instructions on the image-rendering device includes receiving a message sent by the image-rendering device to a multicast address on the network, the message including information regarding the version of the set of instructions on the image-rendering device.

8. The method of claim 1, wherein detecting a version of the set of executable instructions on the image-rendering device includes sending the image-rendering device a query regarding the version of the set of instructions, and receiving from the image-rendering device a response including information regarding the version of the set of instructions.

9. In a computing device configured to be connected to a network, a method of updating over the network executable instructions stored on a plurality of image display devices connected to the network, the method comprising:
    accepting from a user a selection of at least one image display device to which to send an updated set of the executable instructions, the executable instructions being operable to control operation of the image display device as the image display device receives image data and renders such image data for display by the image display device;
    sending the updated set of the executable instructions to the at least one image display device over the network; and
    storing the updated set of executable instructions.

10. The method of claim 9, further comprising presenting to the user a display of the plurality of image display devices from which the user can make the selection.

11. The method of claim 10, wherein the display of the group of the plurality of image display devices includes a display of a version of the executable instructions stored on each of the plurality of image display devices.

12. The method of claim 10, further comprising sending the updated set of executable instructions to at least two of the image display devices selected by the user.

13. The method of claim 10, further comprising displaying a progress of the sending of the updated set of the executable instructions on a progress display.

14. The method of claim 13, further comprising updating the progress display while sending the updated set of the executable instructions.

15. The method of claim 9, wherein the image display device is an image-rendering device configured to be coupled to an image projector to receive data over the network and to provide the data to the image projector for display.

16. In a computing device configured to be connected to a network, a user interface configured to allow a user to select at least one image display device of a plurality of image display devices connected to the network to which to send a set of updated executable instructions for installation, the user interface comprising:
    a portion displaying an identity of each image display device of the plurality of image display devices;
    a portion displaying a version of a set of executable instructions stored on the image display device; and a portion allowing a user to select one or more image display devices to which to send the updated executable instructions, the executable instructions being operable to control operation of such image display device as the image display device receives image data and renders such image data for display by the image display device, and where the executable instructions are configured to be stored on the image display device.

17. The user interface of claim 16, wherein the portion displaying the identity of each image display device displays a common name of each image display device.

18. The user interface of claim 16, further comprising a portion displaying an availability status of each image display device of the plurality of image display devices.

19. The user interface of claim 16, further comprising a progress display that is displayed while the updated executable instructions are sent to the one or more image display devices.

20. The user interface of claim 19, wherein the progress display shows a fraction of a total size of the updated executable instructions that have been sent to the one or more image display devices.

21. The user interface of claim 19, wherein the progress display shows a finished status once the updated executable instructions have been completely sent to the one or more image display devices.

22. The user interface of claim 19, wherein the progress display is periodically updated.

23. A computing device configured to be connected to a network to which an image display device is connected, the computing device comprising:
a processor; and memory containing a first set of executable instructions stored thereon, wherein the first set of executable instructions is executable by the processor to detect a version of a second set of executable instructions stored on the image display device, the second set of executable instructions being operable to control operation of the image display device as the image display device receives image data and renders such image data for display by the image display device, and wherein the first set of executable instructions is executable by the computing device to send an updated version of the second set of executable instructions to the image display device to be stored on the image display device.

24. The computing device of claim 23, wherein the first set of executable instructions is executable by the processor to send the updated second set of executable instructions only if the version of the second set of executable instructions stored on the image display device is not the same version as the updated second set of the executable instructions.

25. The computing device of claim 23, wherein a plurality of image display devices are on the network, each image display device including the second set of executable instructions, and wherein the first set of executable instructions is executable by the processor to detect the version of the second set of executable instructions on each image display device.

26. The computing device of claim 25, wherein the first set of executable instructions is executable by the processor to present a user interface showing each image display device and the version of the second set of executable instructions detected on each image display device.

27. The computing device of claim 26, wherein the first set of executable instructions is executable by the processor to accept from a user a selection of at least one image display device to which to send the updated second set of executable instructions before sending the updated second set of executable instructions.

28. The computing device of claim 23, wherein the first set of executable instructions is executable by the processor to detect a version of the second set of executable instructions on the image display device by receiving a message sent by the image display device to a multicast address on the network, the message including information regarding the version of the set of instructions on the image display device.

29. The computing device of claim 23, wherein detecting a version of the set of executable instructions on the image display device includes sending the image display device a query regarding the version of the set of instructions, and receiving from the image display device a response including information regarding the version of the set of instructions.

* * * * *